US006363304B1

(12) United States Patent
Ramsey

(10) Patent No.: US 6,363,304 B1
(45) Date of Patent: Mar. 26, 2002

(54) PERSONAL DATA COMPUTER FOR VEHICLE MONITORING

(75) Inventor: Reno Ramsey, Sterling Heights, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/591,970

(22) Filed: Jun. 12, 2000

(51) Int. Cl.[7] .............................................. G01C 21/00

(52) U.S. Cl. .......................... 701/35; 701/24; 340/993; 455/556

(58) Field of Search .......................... 701/35, 24, 200, 701/208; 340/993; 455/556

(56) References Cited

U.S. PATENT DOCUMENTS

| | | | |
|---|---|---|---|
| 4,204,255 | A | 5/1980 | Cremer |
| 4,404,641 | A | 9/1983 | Bazarnik |
| 4,441,359 | A | 4/1984 | Ezoe |
| 4,477,874 | A | 10/1984 | Ikuta et al. |
| 4,533,900 | A | 8/1985 | Muhlberger et al. |
| 4,660,140 | A | 4/1987 | Illg |
| 4,707,788 | A | 11/1987 | Tashiro et al. |
| 4,731,769 | A | 3/1988 | Schaefer et al. |
| 4,739,482 | A | 4/1988 | Wrigge |
| 4,773,011 | A | 9/1988 | VanHoose |
| 4,787,041 | A | 11/1988 | Yount |
| 4,926,331 | A | 5/1990 | Windle et al. |
| 4,939,652 | A | 7/1990 | Steiner |
| 4,975,847 | A | 12/1990 | Abe et al. |
| 5,046,007 | A | 9/1991 | McCrery |
| 5,091,856 | A | 2/1992 | Hasegawa et al. |
| 5,253,052 | A | 10/1993 | Hanashiro et al. |

(List continued on next page.)

OTHER PUBLICATIONS

U.S. Patent Application and Drawings for "Vehicle Inspection and Maintenance System", Filed on Aug. 8, 2001.

U.S. Patent Application and Drawings for "Individualized Vehicle Settings", Ser. No. 09/767,930; Filed Jan. 22, 2001.

U.S. Patent Application and Drawings for "Vehicle Systems Data Storage", Ser. No. 09/767,932; Filed Jan. 23, 2001.

U.S. Patent Application and Drawings for "Vehicle Driver Data", Ser. No. 09/850,455; Filed May 7, 2001.

U.S. Patent Application and Drawings for "Vehicle Data Display Device", Ser. No. 09/716,718; Filed Nov. 20, 2000.

U.S. Patent Application and Drawings for "Automated Vehicle Shutdown Sequence", Ser. No. 09/767,999; Filed Jan. 23, 2001.

U.S. Patent Application and Drawings for "Smart Card System For Heavy Vehicles" Ser. No. 09/522,352; Filed Mar. 9, 2000.

*Primary Examiner*—William A. Chucklinski, Jr.
*Assistant Examiner*—Arthur D. Donnelly
(74) *Attorney, Agent, or Firm*—Carlson, Gaskey & Olds

(57) ABSTRACT

A personal computer generally of the type commonly available under the trade name Palm Pilot™ is utilized on a heavy vehicle to obtain information. The information may be analyzed by software provided on the computer. The computer is removed from a docking module on the vehicle and plugged into a docking module at a headquarters base. Data can then be downloaded to the headquarters. At the same time, the headquarters can upload information into the computer which may be then downloaded into the vehicle when the computer is returned to the vehicle. The information taken from the vehicle to the computer may include trip information such as mileage, state line crossing, etc. The information uploaded into the computer may include trip information which can then provide instructions to a navigation system on the vehicle. Moreover, the system may also provide diagnostic analyses while on the vehicle.

5 Claims, 2 Drawing Sheets

U.S. PATENT DOCUMENTS

| | | | |
|---|---|---|---|
| 5,365,436 A | | 11/1994 | Schaller et al. |
| 5,400,018 A | | 3/1995 | Scholl et al. |
| 5,475,399 A | | 12/1995 | Borsuk |
| 5,479,347 A | | 12/1995 | Oguro et al. |
| 5,555,171 A | | 9/1996 | Sonehara et al. |
| 5,680,328 A | | 10/1997 | Sorupski et al. |
| 5,778,381 A | | 7/1998 | Sandifer |
| 5,787,373 A | | 7/1998 | Migues |
| 5,797,107 A | | 8/1998 | Berg et al. |
| 5,801,767 A | | 9/1998 | Wu |
| 5,812,399 A | | 9/1998 | Judic et al. |
| 5,848,365 A | | 12/1998 | Coverdill |
| 5,859,628 A | | 1/1999 | Ross et al. |
| 5,916,286 A | | 6/1999 | Seashore et al. |
| 5,931,878 A | | 8/1999 | Chapin, Jr. |
| 5,933,125 A | | 8/1999 | Fernie et al. |
| 5,948,026 A | | 9/1999 | Beemer, II et al. |
| 5,961,561 A | | 10/1999 | Wakefield, II |
| 5,964,813 A | | 10/1999 | Ishii et al. |
| 5,990,800 A | | 11/1999 | Tamaki et al. |
| 6,003,808 A | | 12/1999 | Nguyen et al. |
| 6,006,147 A | | 12/1999 | Hall et al. |
| 6,006,148 A | | 12/1999 | Strong |
| 6,009,363 A | | 12/1999 | Beckert et al. |
| 6,052,631 A | | 4/2000 | Busch et al. |
| 6,055,468 A | | 4/2000 | Kaman et al. |
| 6,073,063 A | | 6/2000 | Ong et al. |
| 6,084,567 A | | 7/2000 | Ogawa |
| 6,104,971 A | | 8/2000 | Fackler |
| 6,182,006 B1 | * | 1/2001 | Meek ......................... 701/200 |

* cited by examiner

PERSONAL DATA COMPUTER FOR VEHICLE MONITORING

BACKGROUND OF THE INVENTION

This invention relates to the use of a personal computer which is selectively plugged into a vehicle, and into a base facility to selectively gather, analyze and transmit data.

Heavy vehicles such as trucks, typically require a good deal of data storage and gathering. In particular, on a typical heavy truck trip, the driver must gather a good deal of information with regard to the route traveled. As an example, taxes are assessed based on the number of state lines crossed, etc. Thus, it is typically necessary for a truck driver to prepare detailed manual logs during or after a trip.

It would also be desirable to have a system which monitors and analyzes variables during the operation of the vehicle. As an example, it would be desirable to be able to monitor the number of hours driven by an operator, such that an operator is not allowed to drive for too many hours. Moreover, it would be desirable to have a system that can monitor variables such as anomalies in the operation of the vehicle, and analyze such anomalies.

On-board computers are known for vehicles. However, these on-board computers are typically dedicated into the control system for the vehicle. Moreover, the system is relatively expensive in that hardware and software must be individually tailored for the particular vehicle. Many heavy vehicles are manufactured in relatively low runs, and thus, it may not be cost effective to prepare individual computers.

More recently, the assignee of the present invention has proposed a system wherein a so-called "Smart Card" stores information during operation of a vehicle, and may then be taken from the vehicle. This card is able to store information with regard to the vehicle, and with regard to the operator operating the vehicle. While this card does provide many functional benefits, it is not able to perform any computations on the gathered data.

It would be desirable to develop a system which can not only gather, but also analyze and respond to the gathered data.

SUMMARY OF THE INVENTION

In the enclosed embodiment of this invention, a removable personal data assistant ("PDA"), or computer, is docked in a docking station on the vehicle. The PDA gathers operational information from the vehicle. When the driver leaves the vehicle the PDA can be taken with the operator and brought to a headquarters facility. In this way, it is relatively simple to download operational information from the vehicle to the headquarters. Further, the headquarters can upload information into the PDA which can then be transmitted to the vehicle when the driver returns to the vehicle.

Among the types of information which may be gathered and stored by the PDA includes operational information such as driver identification, trip information, operational history for the driver, etc. Moreover, the information which has typically been stored in manual logs by the operator can be simply stored on the computer. As an example, the number of state lines crossed, etc., may be stored.

Moreover, the computer is able to analyze and/or store information from the vehicle during operation of the vehicle to look for anomalies. As an example, a number of particular conditions may be sensed by the computer which would be indicative of a particular problem. The computer may then send a diagnostic signal which will enable the problem to be further identified.

In a most preferred embodiment, an off-the-shelf computer may be utilized. In this way, no expensive hardware or software need be developed. One such PDA is typically known and available under the trade name Palm Pilot™. Such a PDA is easily tailored to include additional software such that the headquarters can program the PDA to include particular software for any particular function the headquarters would like be performed at the vehicle. Again, the use of this system simplifies and facilitates the gathering of data from the vehicle.

These and other features of the present invention can be best understood from the following specification and drawings, the following which is a brief description.

DETAILED DESCRIPTION OF A PREFERRED EMBODIMENT

Figure 1:
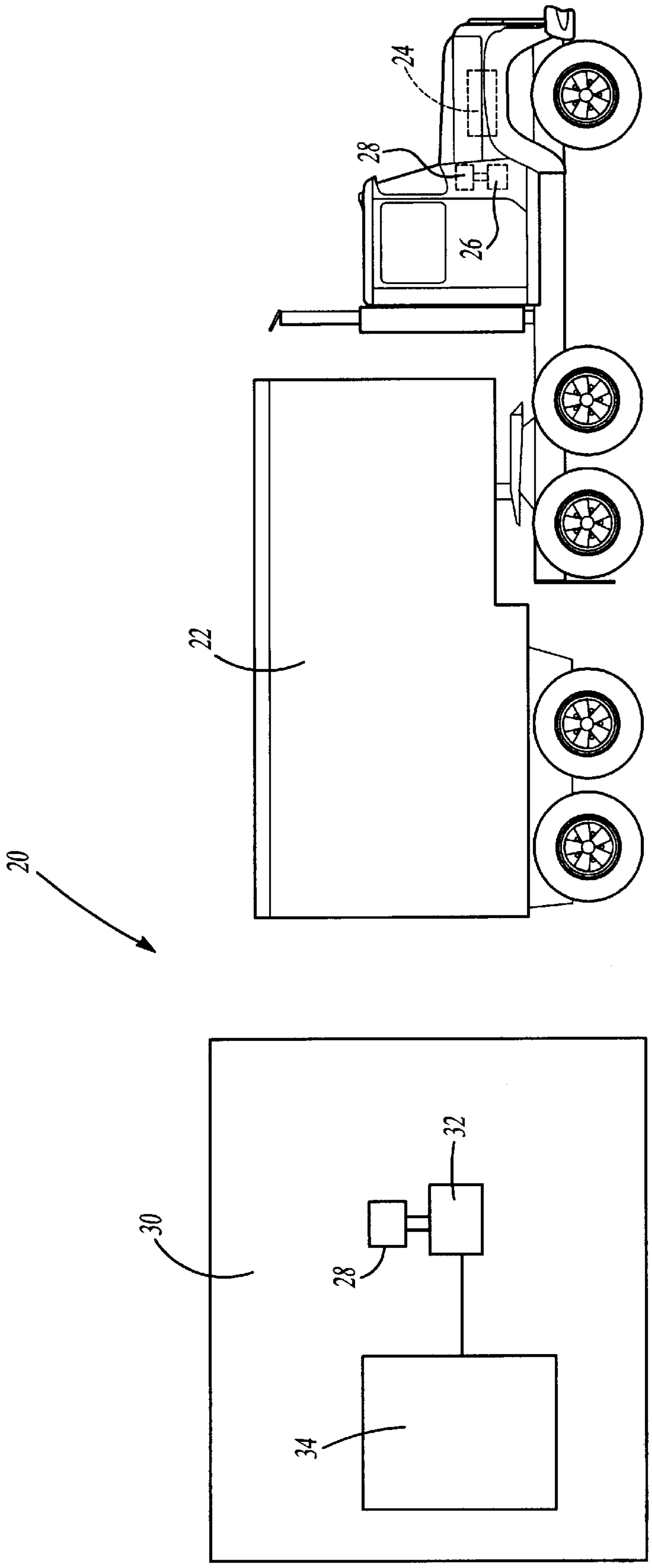
FIG. 1 schematically shows a headquarters and vehicle.

FIG. 1 is a schematic view of a system 20 incorporating a heavy vehicle 22 with an onboard computer 24. Computer 24 communicates through a bus line with a docking module 26. A plug-in computer 28 is plugged into the docking module 26.

A remote headquarters 30 also includes a docking base 32 to receive the plug-in computer 28. The docking base 32 communicates with a headquarters computer 34.

Figure 2:
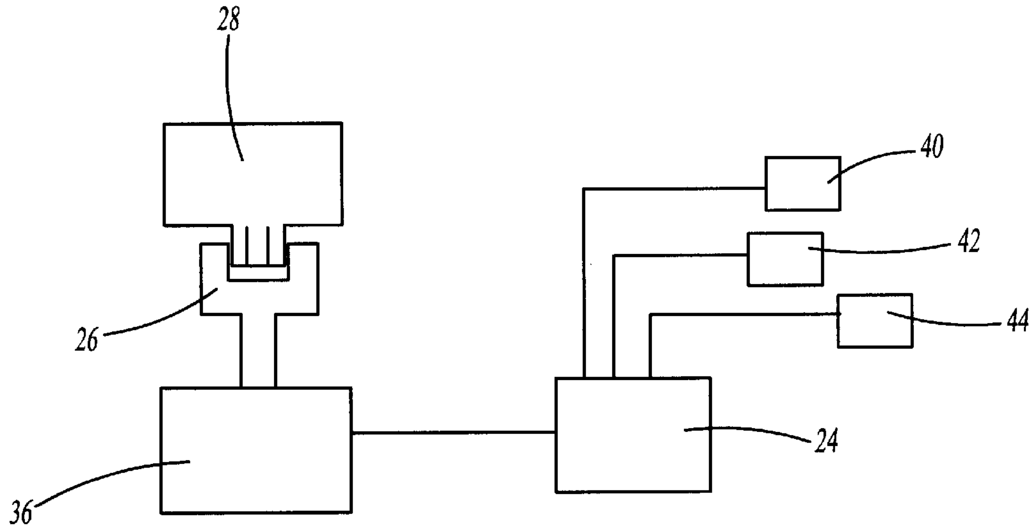
FIG. 2 is a schematic view of the PDA mounted in a vehicle.

As shown in FIG. 2, the computer 24 receives operational information from a number of onboard devices 40, 42, 44. Thus, operational information is transferred through the data bus, into the module 26, and then to the computer 28. Among the information received by the computer 28 is distance traveled, location, navigation system information, etc. The computer 28 calculates information applicable for taxes such as fuel taxes, and taxes based on crossing a state line. The software provided on the personal computer 28 is appropriate for receiving the information and calculating the required taxes.

Moreover, the computer 28 may be provided with the ability to analyze anomalies in the information transferred over the data bus. As an example, if a particular anomaly is indicative of a problem with one of the components 40, 42 or 44, the computer 28 may send a signal which will assist in diagnosing which components is experiencing a failure. That diagnosis is then stored at the computer 28, or a signal can be sent. When the computer 28 is next loaded into the docking bus 32 at headquarters, the computer may download the operational information with regard to the failing component. A worker in this art would understand the signals, etc. that would provide such diagnostic functions.

Updated software, or additional information with regard to the driver, the trip, etc., may be uploaded from the headquarters computer 34 into the computer 28. In this way, chip information, or updated information with regard to what the company would like to be monitored can be uploaded into the control 24 on an ongoing basis. A navigation system which may be one of the components 40, 42 or 44 may be associated with the computer 24, and provide detailed trip information to computer 28. Further, trip information could be uploaded from the headquarters into the vehicle, and would then communicate with the navigation system. Again, the provision of a computer 28 which is relatively inexpensive thus provides valuable benefits.

Further, while plugged into either module 32 or 26, the computer 28 is being recharged.

Figure 3:
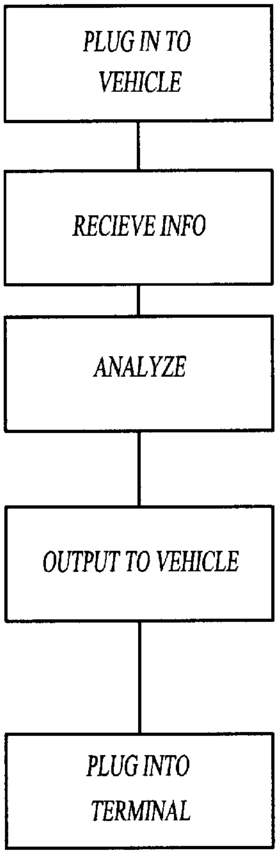
FIG. 3 is a flow chart showing the invention.

FIG. 3 is a flow chart for an invention utilizing the personal computer 28 into a vehicle. First, the computer 28 is plugged into a vehicle. It begins to receive and/or transmit information. Information received may be analyzed for purposes of calculating required taxes. Further, information may be outputted to the vehicle such as the diagnostic information mentioned above.

Finally, the computer may be unplugged from the vehicle and plugged into a terminal at headquarters. At that time data may be downloaded, while other information may be uploaded.

While preferred embodiments of this invention have been disclosed, a worker in this art would recognize that many modifications would come within the scope of this invention. For that reason, the following claims should be studied to determine the true scope and content of this invention.

What is claimed is:

1. A method of gathering and analyzing data from operation of a vehicle comprising the steps of:

(1) providing a docking module on a vehicle, and a second docking module at a remote location;

(2) plugging a removable personal computer into said docking module on a vehicle and operating said vehicle;

(3) storing information from operation of the vehicle at said personal computer, and performing analyses on said information, wherein said personal computer analyzes operational information relating to vehicle component functions and identified anomalies therewith to identify when one of said vehicle components is failing, and then sends control signals to a vehicle control while being docked on said vehicle;

(4) removing said personal computer from said docketing module on said vehicle and plugging said personal computer into said docking module at said remote location to download information from said personal computer to said remote location with regard to which of said vehicle components is failing.

2. A method as recited in claim 1, wherein among the analyses made is taxes required for operation of said vehicle.

3. A method as recited in claim 1, wherein information is uploaded into said computer when docked into said docking module at said remote location, and said information then being downloaded into said vehicle when said personal computer is docked into said vehicle.

4. A method as recited in claim 1, wherein trip information is uploaded into said personal computer and then downloaded into said vehicle.

5. A system as set forth in claim 1, wherein said headquarters also uploads information into said computer to be downloaded into said vehicle.

* * * * *